Patented Aug. 29, 1944

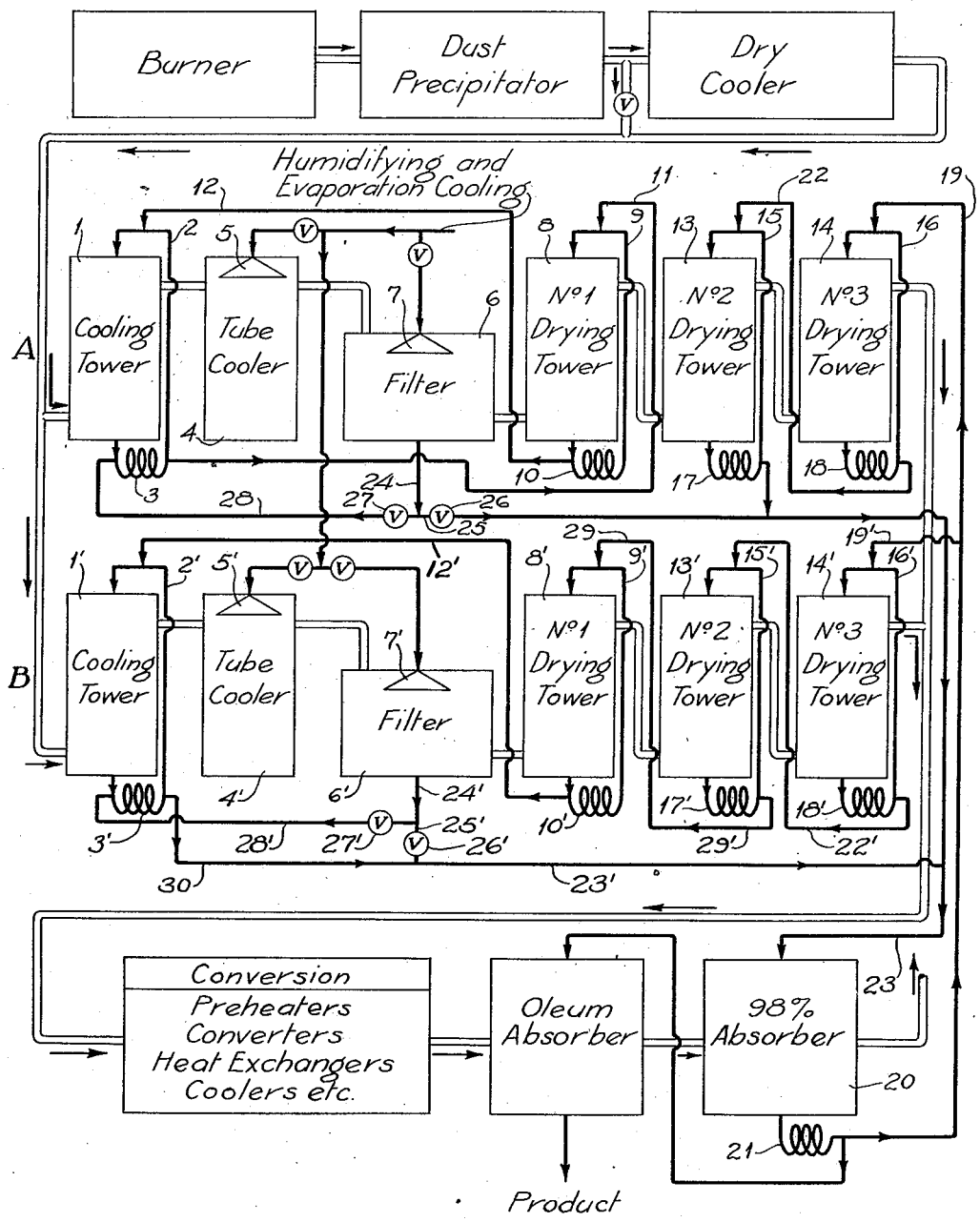

2,357,195

UNITED STATES PATENT OFFICE 2,357,195

CONTACT PROCESS FOR MANUFACTURING SULPHURIC ACID

Carl V. Herrmann, Wilmington, Del., assignor to E. I. du Pont de Nemours & Company, Wilmington, Del., a corporation of Delaware Application May 8, 1941, Serial No. 392,455

4 Claims. (Cl. 23—175)

This invention relates to the manufacture of contact sulphuric acid in a wet purification process in which burner gas is cooled and humidified until it is in equilibrium with a dilute acid to effect separation of impurities and then dried, and has for its general object the provision of improved methods of operation whereby a greater quantity of strong acid may be produced and in which this object is accomplished by so operating the process that part of the water necessary to saturate the burner gas and to produce the desired condition equilibrium with a dilute acid is entrained in a closed cycle and thus made to perform its function over and over again without affecting the strength of the acid produced.

In wet purification processes for making contact sulphuric acid the strength of the acid obtainable is limited by the amount of water which must be introduced into the system to effect the wet purification. So that this may be fully understood it will be necessary to describe generally the operation of the wet purification process.

Burner gas obtained in any suitable manner, as from a sulphur burner or ore burner, is passed through a suitable dust precipitator and then through a dry cooler. The gas, suitably cooled, is then passed into a wet cooler which may be of a variety of designs but in connection with this invention is most suitably a packed tower over which relatively cold sulphuric acid of suitable concentration is continuously passed. Methods in which such towers have been operated heretofore are set forth in Patent 1,943,137 granted January 9, 1934. The gas is then further cooled in a suitable tube cooler which may be air-cooled or water-cooled and in which, if desired, additional water may be introduced into the gas stream further to cool and humidify it. When the gas is suitably cooled and humidified it will be in equilibrium with a dilute acid which is formed from the sulphur trioxide of the burner gas and such sulphuric acid as may have been evaporated into the gas stream from the cooling tower. Some of this acid may condense out into the tube cooler, but other portions will remain as mist in the gas stream which is separated in any suitable separator as a coke filter. This dilute acid acts to scrub the burner gas free of impurities, such as fluorine, chlorine, arsenic and the like, and the scrubbing action may be intensified if desired by any suitable scrubbing tower ahead of the coke filter.

The gases leaving the coke filter are cold, say around 100 or 150° F., depending upon atmospheric conditions and are saturated with water vapor which must be removed in a suitable manner, as by scrubbing the gas with drying acid of proper strength. The ability of drying acid to dry gas depends upon its temperature and strength. If it is too strong contact with saturated gases will cause excessive heating and will impose too great a load upon the cooling system for the drying acid. It is customary, therefore, to effect drying in a plurality of stages in the first of which the saturated gas is contacted with a dilute drying acid and in the last with an acid of sufficient strength satisfactorily to dry the gas. This strong drying acid is obtained by withdrawing 98% acid from the absorbers and dripping it into the circulating system of the last tower. Suitably the acid over the last drying tower is maintained around 90 to 93% strength and spent acid is advanced to the next drying tower. The spent acid from the first drying tower is returned as make-up acid for the 98% absorber. Thus the quantity of 98% acid which must be made, other factors being constant, is determined by the amount of water contained in the saturated burner gas leaving the coke filter and entering the first drying tower. The acid takes this water from the saturated burner gas and introduces it into the 98% absorber, and as a consequence a certain definite minimum of sulphur trioxide must be passed into the 98% absorber to maintain the acid therein at 98%.

This invention provides new methods of operation whereby the amount of water thus introduced into the 98% absorber is reduced, and accomplishes these ends by abstracting a portion of the water from saturated burner gas and advancing it in the system to a point where it can be utilized again to saturate the burner gas. In this manner a portion of the water required to saturate the burner gas is shuttled back and forth in an intermediate cycle and never enters into the absorption system at all. Hence the amount of sulphur trioxide required in the 98% absorber is reduced, and correspondingly the amount of strong acid, or oleum, which can be produced is substantially increased.

In the accompanying flow sheet I have illustrated suitable methods for effecting the principles of my invention as set forth above. In this flow sheet I have illustrated diagrammatically a burner, a dust precipitator and a dry cooler, which are in all respects identical with the prior art, which feed burner gas to two parallel lines A and B of wet purification. These two wet purification lines are illustrative of two modifications of the invention and of course either may be used separately. These wet purification lines feed dry and purified burner gas to the conversion units which in turn feed the absorption unit, all which are constructed and operated according to conventional practice in the art.

Referring more particularly to the wet purification line A, the hot burner gas enters the cooling tower 1 where it is scrubbed with acid continuously circulated over the tower through the circuit 2 which includes the cooler 3 and other apparatus, not shown, conventionally used in circulating acid over a tower. The gas leaving the cooling tower 1 passes through the tube cooler 4, which is provided with a suitable spray means 5 by which water may be introduced to cool and humidify the gas. The gas leaves the tube cooler 4 as cold as conveniently practical in view of atmospheric conditions and enters the scrubber and separator device, which may be simply a coke filter 6 or the combination of a scrubbing tower and coke filter. The gases entering the filter 6 come in contact with a water spray introduced through spray head 7 whereby they are further humidified and cooled. The dilute acid thus collected in the filter operates thoroughly to scrub the gas free of impurities and has a composition governed by the temperature and the amount of water introduced into the burner gas either by evaporation from the cooling tower 1 or through the spray heads 5 and 7. Ordinarily the strength of this scrubbing acid will not be greater than 40° Bé., and may be anything less depending upon the amount of water introduced. Whatever its strength, and the more dilute acids favor more complete removal of impurities, it will be in equilibrium with the gases passing through the filter. The latter as they leave the filter will be essentially saturated with water vapor, depending upon the strength of this dilute acid. These gases will be sufficiently near saturation that for the purpose of this description they may be designated as saturated.

The saturated gas then enters the No. 1 drying tower 8 over which is continuously circulated a dilute drying acid through the circuit 9 which includes the cooler 10 and such other apparatus, not shown, as is customarily used in circulating acid over a tower. The strength of this dilute drying acid is maintained by dripping acid into the circuit 9 through the line 11 which communicates with the cold side of cooler 3, and the make in the No. 1 drying tower is bled off from the hot side of cooler 10 and advanced to the cooling tower 1 where it is dripped into the circulating circuit 2. Thus, acid which is diluted by the absorption of water in drying tower 1 is advanced to the cooling tower 1 where it is concentrated, whence it is returned to maintain the strength of the dilute drying acid circulated over the No. 1 drying tower 8. Thus a definite quantity of water is shuttled back and forth between the No. 1 drying tower and the cooling tower.

The gas leaving the No. 1 cooling tower then passes through the No. 2 and No. 3 drying towers 13 and 14 over which are circulated drying acid of intermediate strength and strong drying acid, respectively, through the external circuits 15 and 16, which include the coolers 17 and 18, and such other apparatus, not shown, as is customarily used in circulating acid over a tower. The strength of the strong drying acid is maintained by dripping 98% absorber acid into the circuit 16 through line 19 which communicates with the 98% absorber 20 through the cooler 21. The strength of the intermediate acid is maintained by withdrawing acid from the cold side of cooler 18 and advancing it through line 22 to the No. 2 drying tower where it is dripped into the circuit 15. The make of these two towers is bled off from the cold side of cooler 17 through line 23 which returns to the 98% absorber.

According to the prior art methods of operating a cooling tower, as exemplified at 1 in the flow sheet, either a dilute acid or a fairly strong acid, as pointed out in Patent 1,943,137, may be used. If a dilute acid is employed the volume is maintained relatively small and a high degree of concentration is effected in the cooling tower. The cooling is thus effected largely by evaporation of water, since the circulation over the tower necessary to effect any substantial degree of cooling otherwise is not practical where so much concentration is to be effected. Alternatively a relatively strong acid (45–55° Bé.) is continuously circulated over the tower and the cooling effected largely in an external cooler. The amount of cooling which can thus be effected is largely determined by the amount of acid circulated, the capacity of the external cooler and the temperature of the cooling water, though some slight degree of cooling may also be effected by evaporation in the cooling tower.

In the operation of my invention as described above I depart from the prior art, first, by providing a closed cycle between the cooling tower and the No. 1 drying tower as already described and, second, by operating the cooling tower with an acid of still greater strength, that is to say, stronger than 55° Bé., I maintain the dilute drying acid circulated over the No. 1 drying tower as strong as is practical considering the moisture content of the gas, the capacity of the cooler 10 and the temperature of the cooling water. This may suitably be maintained at some figure above about 55° Bé. as may be most suitable for the conditions obtaining. This acid in circulating over the tower, depending upon the particular conditions obtaining, will drop a small amount in strength, say about 1 to 3° Bé., but will again be brought up to strength by dripping in acid through line 11. Conversely in the cooling tower the circulating acid will be concentrated in passing through the tower a corresponding amount, say about 1 to 3° Bé. The strength of the acid fed to the tower is controlled by dripping relatively dilute acid from the line 12. The amount of concentration which may be effected in the cooling tower depends largely upon the temperature of the entering gas which may be regulated as desired to effect a suitable balance between the cooling tower and the No. 1 drying tower by by-passing hot gas past the dry cooler.

The acid produced in filter 6, which may be augmented somewhat by evaporation of sulphuric acid from the cooling tower 1, is removed through line 24 for such disposal as may be deemed necessary or desirable. Suitably it may be passed into line 25 to valve 26 whence it passes through line 23 to the 98% absorber. Most suitably, however, the entire quantity, or at least a good portion of it, is passed through valve 27 into line 28 which communicates with the circulating circuit 2 on the hot side of the cooler 3. By introducing this dilute impure acid into the hot concentrated effluent from the cooling tower 1 the volatile impurities, such as fluorine, chlorine and the like, are largely stripped and discharged into the atmosphere and in this manner purged from the system. A similar but lesser effect may be obtained by introducing the acid into the circulating current 2 on the cold side of cooler 3.

In the form of the invention illustrated in the wet purification unit B the primed numerals are indicative of circuits and apparatus which correspond to the similarly identified circuits of the wet purification line A. Both modifications effect similar ends in regard to the transfer of water back and forth from the cooling tower and the No. 1 drying tower though the particular hookups differ, as will be pointed out.

In the system B the strength of the drying tower acid circulated in the circuit 9' is maintained by withdrawing the make from the No. 2 drying tower through line 29' and dripping it into the circuit 9'. The make from No. 1 drying tower is withdrawn from the hot side of cooler 10' through line 12' and introduced into the circulating line 2'. The make from cooling tower 1' is withdrawn through line 30 which communicates with line 23' and thence to the 98% absorber. Thus 98% acid is dripped over the No. 3 drying tower and advanced successively over all the towers in the system and then returned to the 98% absorber from the cooling tower 1'.

The mechanism whereby this system accomplishes the object of the invention is as follows: The quantity of water which in any given system may enter the No. 1 drying tower is fixed, since any greater quantity introduced through the cooling tower 1—1' or the spray heads 5—5' and 7—7' will condense in the filter and be removed through line 24—24'. A certain quantum of this fixed quantity of water will be absorbed in the No. 1 drying tower and passed through line 12—12' to the cooling tower where a like quantum will be evaporated into the burner gas. Thus a definite quantum of water is in effect shuttled back and forth between the cooling tower 1—1' and the No. 1 drying tower 8—8'. Since normally all the water present in the gas entering into the No. 1 drying tower would eventually find its way into the 98% absorber it is evident that in my process the amount of water thus entering into the absorber is reduced by the quantum which, as previously explained, is shuttled back and forth between the cooling tower and the No. 1 drying tower. Thus less sulphur trioxide will be required to make 98% acid in the 98% absorber and consequently more or stronger acid may be made in the oleum absorber.

While I have described my invention with reference to certain particular embodiments thereof, it is possible to obtain the objects set forth under widely differing conditions of operation and it is to be understood, therefore, that within the scope of the appended claims such variations come within the spirit of the invention.

I claim:

1. In the manufacture of contact sulphuric acid by a contact process from burner gas containing impurities the steps of cooling and humidifying said burner gas until a dilute acid is condensed, said cooling and humidifying including scrubbing the burner gas with a scrubbing medium comprising spent drying acid while the burner gas is still hot enough to concentrate said spent drying acid whereby a certain quantum of the water of said spent drying acid is introduced into the burner gas, separating said dilute acid from said burner gas, and drying the burner gas by scrubbing the humidified burner gas with drying acid in a plurality of stages in the first of which the drying acid is relatively dilute and in the last of which the drying acid is sufficiently concentrated adequately to dry the burner gas, advancing the make from said first drying stage to said initial scrubbing as said spent drying acid whereby part of the water necessary to humidify the burner gas is shuttled back and forth between said initial scrubbing and said first drying stage.

2. In the manufacture of contact sulphuric acid by a contact process from burner gas containing impurities the steps of cooling and humidifying said burner gas until a dilute acid is condensed, said cooling and humidifying including scrubbing the burner gas with a scrubbing medium comprising spent drying acid while the burner gas is still hot enough to concentrate said spent drying acid whereby a certain quantum of the water of said spent drying acid is introduced into the burner gas, separating said dilute acid from said burner gas, and drying the burner gas by scrubbing the humidified burner gas with drying acid in a plurality of stages in the first of which the drying acid is relatively dilute and in the last of which the drying acid is sufficiently concentrated adequately to dry the burner gas, advancing the make from said first drying stage to said initial scrubbing as said spent drying acid and returning the make from said initial scrubbing to make up the drying acid for the first drying stage, whereby part of the water necessary to humidify the burner gas is shuttled back and forth between said initial scrubbing and said first drying stage.

3. In the manufacture of contact sulphuric acid by a contact process from burner gas containing impurities the steps of cooling and humidifying said burner gas until a dilute acid is condensed, said cooling and humidifying including passing the burner gas through a cooling tower over which is continuously circulated an acid of at least 55° Bé. strength in a circuit including an external cooler while the burner gas is still hot enough to concentrate said acid in its passage through the tower, separating said dilute acid from said burner gas, drying the burner gas by passing the humidified burner gas into a drying tower over which is circulated dilute drying acid in an external circuit including a cooler whereby part of the water contained in the humidified burner gas is transferred to the dilute drying acid, withdrawing the make from said drying tower and introducing it into the acid circulated over the cooling tower and withdrawing the make of said cooling tower and introducing it into the system at a point subsequent to the humidifying of the burner gas.

4. In the manufacture of contact sulphuric acid by a contact process from burner gas containing impurities the steps of cooling and humidifying said burner gas until a dilute acid is condensed, said cooling and humidifying including passing the burner gas through a cooling tower over which is continuously circulated an acid of at least 55° Bé. strength in a circuit including an external cooler while the burner gas is still hot enough to concentrate said acid in its passage through the tower, separating said dilute acid from said burner gas, drying the burner gas by passing the humidified burner gas into a drying tower over which is circulated dilute drying acid in an external circuit including a cooler whereby part of the water contained in the humidified burner gas is transferred to the dilute drying acid, withdrawing the make from said drying tower and introducing it into the acid circulated over the cooling tower and withdrawing the make of said cooling tower and introducing it into the acid circulated over said drying tower.

CARL V. HERRMANN.